United States Patent Office 3,056,802
Patented Oct. 2, 1962

3,056,802
ALPHA-HALO LACTONES
Benjamin Phillips and Frederick C. Frostick, Jr., Charleston, W. Va., assignors to Union Carbide Corporation, a corporation of New York
No Drawing. Filed Oct. 4, 1960, Ser. No. 60,321
9 Claims. (Cl. 260—343)

The invention relates generally to alpha-halo lactones and to a process for preparing them.

Halogen-containing lactones are useful compounds which can be employed, for example, as chemical intermediates for the preparation of halogen-containing acids, amino acids, amino-lactams, and the like. These lactones can also be polymerized to halogen-containing polyesters, which can be used, for example, as plasticizers for vinyl halide polymers.

This invention has as its main object the provision of novel alpha-halo lactones and a novel process for making them. Another object of the invention is to provide as a new composition, alpha-chloro-epsilon-caprolactone, and a process for its preparation. Other objects of the invention will be apparent from the accompanying specification and description.

One or more of the above objects are accomplished by a process which comprises reacting (1) an alpha-halo cyclic ketone having the structure that is represented by Formula I (I)
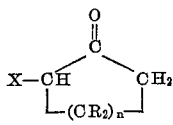

wherein X represents a halo group, each R individually represents a hydrogen atom or an alkyl radical having from one to four carbon atoms, and $n$ represents an integer having a value of from two to four, with (2) peracetic acid, for a period of time sufficient to produce an alpha-halo lactone. The alpha-halo lactones so produced are compounds that are represented by Formula II (II)
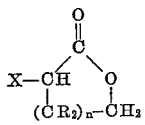

wherein X, R, and $n$ are described above.

Unexpectedly, the invented process produces only the alpha-halo isomer. From an examination of the alpha-halo cyclic ketone which is employed as the starting material, it would be expected that the omega-halo lactone isomer would also be produced, at least in approximately equal quantities with the alpha-halo lactone. Indeed, it has been found that when an alpha-alkyl cyclic ketone is oxidized to a lactone, production of the omega-alkyl lactone is favored.[1, 2]

The alpha-halo cyclic ketones which are employed in the process of the invention are those having 5-, 6-, and 7-membered ring structures. The halo group, which is bonded to the carbon atom that is alpha to the carbonyl, can be any halogen atom such as fluorine, chlorine, bromine and iodine. It is preferred, however, to employ the alpha-chloro and alpha-bromo cyclic ketones, with the alpha-chloro cyclic ketones being most preferred.

Referring to Formula I above, it is seen that any of the carbon atoms on the ring that are not adjacent to the carbonyl can have alkyl substituents, wherein the individual alkyl groups have up to about four carbon atoms. These alkyl groups can be methyl, ethyl, propyl, isopropyl, butyl, and the like. It is preferred that there be not more than one alkyl group substituent on any one ring carbon atom, and it is also preferred that the total number of carbon atoms contained in the alkyl group substituents not exceed six.

Representative of the alpha-halo cyclic ketones which can be employed in the invention are alpha-chlorocyclopentanone, alpha-chlorocyclohexanone, alpha-chlorocycloheptanone, alpha-bromocyclopentanone, alpha-iodocyclohexanone, alpha-fluorocycloheptanone, alpha-chloro-beta-methylcyclopentanone, alpha-chloro-gamma-ethylcyclohexanone, alpha-chloro-delta-propylcycloheptanone, alpha-bromo-beta,gamma-dimethylcyclopentanone, alpha-chloro-beta-methyl-gamma-butylcyclohexanone, and the like.

In the process of the invention, the alpha-halo cyclic ketone is reacted with peracetic acid to form the corresponding alpha-halo omega-lactone. The proportions of the reagents can be varied over a wide range: for example, from about one mole, and lower, to about five moles, and higher, of peracetic acid per mole of alpha-halo cyclic ketone. It is desirable to employ a stoichiometric excess of peracetic acid in order to effect maximum conversion of the alpha-halo cyclic ketone to the corresponding alpha-halo lactone. Therefore, the preferred proportions are from about 1.1 to about 2 moles of peracetic acid per mole of alpha-halo cyclic ketone.

The process of the invention can be carried out over a wide temperature range. A suitable temperature range is from about 10° C. to about 100° C. An important factor to be considered in selecting a temperature is the exothermic nature of the reaction. It has been observed that the reaction rate is satisfactory and heat removal can be effected conveniently at a reaction temperature between about 40° C. and about 70° C., although the process is operative at temperatures above and below this range. Both heating and cooling can be applied to the reaction, when appropriate, in order to maintain the reactants within the desired temperature range.

The pressure at which the reaction is carried out is not critical, and can be sub-atmospheric, atmospheric, or super-atmospheric.

It is preferable that the reaction be carried out under anhydrous conditions. The presence of water does not render the process inoperative, but there is a possibility that either the lactone moiety of the product or the halo group will be hydrolyzed if water is present. It is therefore preferred that both the alpha-halo cyclic ketone and the peracetic acid be anhydrous.

The reaction is continued for a period of time sufficient to effect reaction between the alpha-halo cyclic ketone and peracetic acid to produce the corresponding alpha-halo lactone. The particular reaction time employed will depend, to an extent, upon a variety of factors, such as temperature, nature of the reactants, and the like, and can be varied from about one hour, and shorter, to about forty hours, and longer. A reaction time of from about two hours to about twenty hours is preferred.

If desired, an inert, normally-liquid organic vehicle can be added to the reaction mixture to serve as a diluent and/or solvent for the reactants. Examples of organic liquids which can serve as diluents include esters such as ethyl acetate, propyl acetate, ethyl butyrate, and the like; ketones such as methyl ethyl ketone, methyl isobutyl ketone, diisobutyl ketone, and the like; aromatic hydrocarbons such as benzene, toluene, xylene, and the like; aliphatic and cycloaliphatic hydrocarbons such as hexane, heptane, cyclohexane, and the like. It is preferred when a diluent is employed that said diluent be anhydrous.

It is preferred that the peracetic acid be slowly added in increments to the alpha-halo cyclic ketone in order to help control the temperature. There is no objection

[1] Baeyer and Villiger, Ber. 32, 3625 (1899); 33, 858 (1900).
[2] Doering and Speers, J.A.C.S., 72, 5515 (1950).

to reversing the order of addition except for the safety factors involved when a large quantity of peracetic acid is heated.

The progress of the reaction can be checked, if desired, by analyzing the reaction mixture for peracetic acid content. The peracetic acid content can be determined, for example, by introducing 1–1.5 grams of the reaction mixture into a flask containing 60 milliliters of 50 weight percent aqueous sulfuric acid solution and five milliliters of a saturated aqueous potassium iodide solution. The flask is swirled to mix the solutions and then immediately titrated with a 0.1 N aqueous sodium thiosulfate solution to a colorless endpoint. (If desired, a little starch can be added to the flask in order to accentuate the color of the iodine that is liberated when the peracetic acid reacts with the potassium iodide.) From the titration data thus obtained, a determination of the peracetic acid content can be made.

The product—that is, the alpha-chloro lactone—can be separated from the reaction mixture by conventional methods, such as by fractional distillation to remove acetic acid, unreacted peracetic acid and alpha-halo cyclic ketone, and any organic diluent that was employed.

The alpha-halo lactones prepared by the process of this invention are useful for many purposes. For example, alpha-chloro-epsilon-caprolactone can be employed to prepare $d,l$-lysine by first preparing the alpha-amino-epsilon-caprolactam and then hydrolyzing the caprolactam. These alpha-halo lactones can be polymerized to polyesters having a wide range of utility. For example, the relatively low-molecular-weight polyesters are useful in the preparation of plasticizers, cosmetics, polishes, and waxes and can also be used as thickening agents for various lubricants. The higher-molecular-weight polyesters are useful in the preparation of molded articles, films, fibers, and the like. The polyesters are prepared, for example, by contacting the monomeric alpha-halo lactone with a catalyst such as boron trifluoride for a period of time sufficient to produce a polymer.

The following, non-limiting examples are illustrative of the invention.

EXAMPLE I

*Preparation of Alpha-Chlorocyclohexanone*

To a 3-liter 4-necked flask equipped with stirrer, thermometer, gas diffuser inlet tube, and outlet port, were charged 294 grams of cyclohexanone and 900 milliliters of water. Over a period of 50 minutes, 257 grams of chlorine were added through the diffuser while the agitated reaction mixture was maintained between 20–40° C. The organic phase of the reaction mixture was then separated from the aqueous phase. The aqueous phase was washed three times with 150 milliliter portions of diethyl ether, which were added to the organic phase. The combined organic phase was washed once with 150 milliliters of water and once with 200 milliliters of saturated sodium chloride solution, after which it was dried over anhydrous sodium sulfate. The product from two such runs was distilled. After removal of the ether there was obtained 522 grams of a portion boiling below 110° C. at 13 mm. pressure. Redistillation of this portion yielded 374 grams of alpha-chlorocyclohexanone, boiling point 89–94° C./15 mm., $n$ 30/D 1.4805, corresponding to a yield of 47 percent of the theoretical.

EXAMPLE II

*Preparation of Alpha-Chloro-Epsilon-Caprolactone*

To 300 grams of alpha-chlorocyclohexanone (2.28 moles) were aded 808 grams of a 25.5 weight percent anhydrous solution of peracetic acid (2.71 moles) in ethyl acetate. During the addition, which took two hours and 25 minutes, the reaction mixture was gently agitated. The reaction was exothermic, and the temperature was maintained in the range of 50–55° C. by intermittent cooling with an ice-water bath. After an additional four and one-half hours of gentle agitation, an analysis for peracetic acid indicated that 80.5 percent of the theoretical amount of peracetic acid had reacted. The reaction mixture was then permitted to stand overnight at room temperature and further analysis indicated that 95.6 mole percent of the theoretical amount of peracetic acid had been consumed.

The reaction mixture was then distilled under reduced pressure. After removal of the volatiles, that is, ethyl acetate, acetic acid, and peracetic acid, a forecut consisting of 122 grams of a mixture of alpha-chlorocyclohexanone and alpha-chloro-epsilon-caprolactone was removed. Said forecut boiled from 62° C. to 108° C. at 3 mm. There was then obtained 129 grams of alpha-chloro-epsilon-caprolactone, a liquid having a boiling point of 108–111° C. at 3 mm. pressure and a refractive index of 1.4865–1.4875 ($n$ 30/D). Approximately 50 grams of residue remained in the kettle.

EXAMPLE III

*Proof of Structure of Alpha-Chloro-Epsilon-Caprolactone*

To 195 grams of alipha-chlorocyclohexanone were added 651 grams of a 21.3 weight percent anhydrous solution of peracetic acid in ethyl acetate. The addition took three hours, and was done while the reaction mixture was gently agitated at 60–70° C. After an additional three-hour reaction period, 99.3 mole percent of the theoretical amount of peracetic acid had been consumed. The reaction mixture was stripped of volatiles in a still to a kettle temperature of 70° C. at 3 mm. pressure. There remained 223 grams of alpha-chloro-epsilon-caprolactone as a residue product.

The residue product was treated with 1000 milliliters of 48 percent aqueous hydrobromic acid and 240 milliliters of sulfuric acid overnight at room temperature, followed by four hours at 100° C. The reaction mixture was cooled and poured into water. The water was saturated with salt and the organic phase was extracted with diethyl ether and dried over anhydrous sodium sulfate. Fractional distillation of the ether solution gave 162 grams of alpha-chloro-epsilon-bromocaproic acid, boiling point 154–160° C. at 3 mm. This reaction is illustrated by the equation:

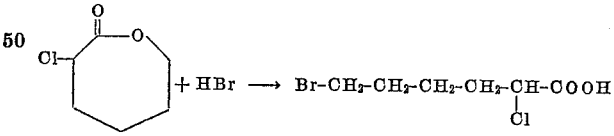

Treatment of 30 grams of the alpha-chloro-epsilon-bromocaproic acid with 300 milliliters of 28 percent aqueous ammonia for four days at room temperature, followed by removal of the ammonia and water on a steam bath, gave a solid residue. This residue was taken up in concentrated hydrochloric acid, heated on a steam bath, and concentrated under vacuum. Ammonium bromide and ammonium chloride precipitated from solution, and the precipitate was filtered. The filtrate was then evaporated to dryness, and the residue was taken up in hot ethanol. Additional ammonium bromide and ammonium chloride, which precipitated, were filtered off, and the filtrate was cooled and treated with diethyl ether. Further cooling caused the precipitation of 15 grams of solid piperidine-2-carboxylic acid hydrochloride, melting point 251–253° C. This product established that the halogens on the dihalocaproic acid were in the 2 and 6 positions, and that the product from the reaction of peracetic acid and alpha-chlorocyclohexanone was alpha-chloro-epsilon-caprolactone. The conversion of the dihalocaproic acid to piperidine-2-carboxylic acid hydrochloride is illustrated in the following equations:

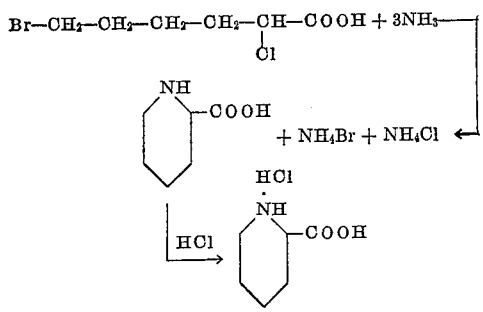

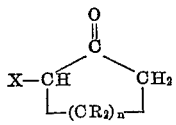

What is claimed is:

1. A process which comprises reacting an alpha-halo cyclic ketone having the formula

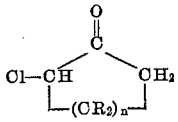

wherein X represents a halo group, each R individually represents a member selected from the group consisting of hydrogen and alkyl having from one to four carbon atoms, and $n$ is an integer having a value of from two to four, with peracetic acid, and for period of time sufficient to produce an alpha-halo lactone.

2. The process of claim 1 wherein said process is carried out at a temperature in the range of from about 10° C. to about 100° C.

3. A process which comprises contacting an alpha-chloro cyclic ketone having the formula wherein each R individually represents a member selected from the group consisting of hydrogen and alkyl having from one to four carbon atoms, and $n$ is an integer having a value of from two to four, with peracetic acid, for a period of time sufficient to produce an alpha-chloro lactone, wherein said process is carried out at a temperature in the range of from about 10° C. to about 100° C.

4. A process which comprises contacting alpha-chloro-cyclohexanone with peracetic acid, for a period of time sufficient to produce alpha-chloro-epsilon-caprolactone, wherein said process is carried out at a temperature in the range of from about 10° C. to about 100° C.

5. Alpha-chloro-epsilon-caprolactone.
6. Alpha-halo-epsilon-caprolactone.
7. Alpha-halo-beta-alkyl-epsilon-caprolactone wherein the alkyl moiety has from 1 to 4 carbon atoms.
8. Alpha - halo - gamma - alkyl - epsilon - caprolactone wherein the alkyl moiety has from 1 to 4 carbon atoms.
9. Alpha-halo-delta-alkyl-epsilon-caprolactone wherein the alkyl moiety has from 1 to 4 carbon atoms.

References Cited in the file of this patent
FOREIGN PATENTS
552,726    Belgium _____ Dec. 12, 1956